US010855547B2

(12) United States Patent
Abu Asba et al.

(10) Patent No.: US 10,855,547 B2
(45) Date of Patent: Dec. 1, 2020

(54) DEPENDENCY ASSESSMENT INTERFACE FOR COMPONENTS OF GRAPHICAL USER INTERFACES

(71) Applicant: ServiceNow, Inc., Santa Clara, CA (US)

(72) Inventors: Nabil Abu Asba, The Hague (NL); Ying Li, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 75 days.

(21) Appl. No.: 16/247,190

(22) Filed: Jan. 14, 2019

(65) Prior Publication Data

US 2020/0228412 A1 Jul. 16, 2020

(51) Int. Cl.
*H04L 12/24* (2006.01)
*G06F 9/451* (2018.01)

(52) U.S. Cl.
CPC .............. *H04L 41/14* (2013.01); *G06F 9/451* (2018.02); *H04L 41/22* (2013.01)

(58) Field of Classification Search
None
See application file for complete search history.

(56) References Cited

U.S. PATENT DOCUMENTS

| 10,216,621 | B1* | 2/2019 | Rutten | G06F 16/2455 |
| 2016/0085399 | A1* | 3/2016 | Jain | H04L 43/045 |
| | | | | 715/738 |
| 2016/0105335 | A1* | 4/2016 | Choudhary | H04L 69/329 |
| | | | | 709/224 |
| 2018/0089269 | A1* | 3/2018 | Pal | G06F 16/24554 |
| 2018/0089324 | A1* | 3/2018 | Pal | G06F 16/9535 |

* cited by examiner

*Primary Examiner* — Clayton R Williams
*Assistant Examiner* — Tania M Pena-Santana
(74) *Attorney, Agent, or Firm* — Fletcher Yoder PC

(57) ABSTRACT

A system and method is disclosed for configuring a performance analytics (PA) system for processing key performance indicators of a managed network. The PA system may include a database containing PA entity records, each including data associated with a respective PA entity. Each PA entity may be a software and/or hardware component of the PA system. The system also includes a dependency assessment tree having respective nodes corresponding to the respective PA entities and branches connecting functionally dependent nodes of PA. The PA system may be configured to: transmit information to a client device for displaying a graphical representation of one or more respective PA entities; receive a request from the client device for dependency information for a first PA entity; and transmit to the client device a graphical representation of a first portion of the dependency assessment tree depicting the first PA entity and associated dependency nodes.

20 Claims, 14 Drawing Sheets

DEPENDENCY ASSESSMENT INTERFACE FOR COMPONENTS OF GRAPHICAL USER INTERFACES

BACKGROUND

Managed networks may include various types of computer networks that can be remotely administered. This management may involve one or more computing devices disposed with a remote network management platform collecting information about the configuration and operational states of software applications executing on behalf on the managed network, and then presenting representations of this information by way of one or more user interfaces. The user interfaces may be, for instance, web-based user interfaces. In some instances, remote management of networks may be provided by a third party, such as a service provider or vendor.

Some of the collected information may relate to key performance indicators (KPIs). KPIs include any sort of measurement, reading, or data that is relevant to the managed network. Thus, KPIs may reflect performance of computing devices on the network itself (e.g., memory utilization, processor utilization, transactions per second) or performance of higher-level applications executing on the remote network management platform (e.g., a number of times per day that users on the managed network have requested a particular type of technical assistance). Among other capabilities, the user interfaces may be able to display KPIs in numerous visualizations, such as charts, graphs, or tables.

Monitoring, analysis, and visualization of KPIs may be implemented as a specific facility or environment within an overall remote network management system, and may involve databases and servers in or associated with a managed network as well as end-user devices, such as client devices with graphical user interfaces (GUIs). Visualization and analysis tools may include various software components, which may be updated and/or revised from time to time. Therefore, in addition to functional capabilities used in practice, stability and integrity of visualization and analysis tools during and after updates and/or revisions may also be of interest.

SUMMARY

A performance monitoring and analysis system may implement monitoring, analysis, and visualization of KPIs within an overall remote network management system as a Performance Analytics (PA) application program with extendable features and capabilities. In accordance with example embodiments, a PA application program may include program components configured to operate on one or more servers and databases in a remote network management system, as well as client-based program components, such as web applications with graphical features and functions, configured to operate on client devices having graphical user interfaces (GUIs). Server and database programs may collect, record, and manage data related to and/or indicative of performance from a managed network, while client applications may provide end users with tools to define KPIs and configure and control monitoring of KPIs, as well as to retrieve KPI data from databases or servers for visualization, analysis, and evaluation of KPIs. A PA system may therefore include a PA application program, as well as supporting hardware components and systems, such as servers, databases, computing devices, and client devices.

More particularly, data related to and/or indicative of performance may include data directly related to performance, such as incident or problem reports logged by end users or IT personnel, for example. Other forms of direct performance data may include monitored or measured resource utilization (e.g., memory, CPU, and network bandwidth). Performance data may also include data related to the mission of an organization, such as sales or financial results. In addition, performance data may include indirect or derived forms of performance metrics that may involve relationships between two or more forms of recorded or monitored data. All or some of the various types and forms of performance data may be stored in one or more network databases, and be available within the PA context for analysis, viewing, and evaluation via direct transactions with the databases, or via intermediary server applications, for example.

Defining or creating KPIs may entail identifying directly available or derivable variables that may be indicative of behavior or performance when monitored in time. Configuration and control may entail setting parameters that determine monitoring frequency and duration, as well as various filters applied during collection and/or derivation of KPI data. KPIs may thus be considered descriptions of data that form the basis of the indicators, as well as parameters and filters. The actual performance analysis or assessment for a given KPI then utilizes actual data specified and collected according to the given KPI.

In a large managed network, the breadth and depth of data that may be utilized by a PA system can be quite large. Correspondingly, the number and variety types of possible interrelationships between monitored or logged data that may form the basis of KPIs can also be large. In addition, the interrelationships and dependencies of functional components of a PA system can be large and complex. These factors present challenges to designing and implementing a PA system that provides versatility and flexibility to end users without imposing the underlying complexities on end users when they invoke operations that rely on or need to account for those complexities. It would therefore be desirable to devise and implement user interfaces that provide streamlined and efficient graphical tools for carrying out PA tasks involving complex relationships among and between performance data, and between program components of the PA system.

Accordingly, a first example embodiment may involve a performance analytics (PA) system disposed within a computational instance of a remote network management platform that is associated with a managed network and configured for processing and analysis of performance data of the managed network, the PA system comprising: a database containing a plurality of PA entity records, each PA entity record comprising data for configuring a graphical representation of a respective PA entity on a graphical user interface (GUI) within the managed network, wherein the respective PA entity is a component of the PA system configured for processing one or more key performance indicators (KPIs) of the managed network, and is implemented as at least one of a software component or a hardware system, and wherein each PA entity record further comprises information specifying a logical location of the respective PA entity in a dependency assessment tree, the dependency assessment tree comprising (i) respective nodes corresponding to the respective PA entities of the plurality of PA entity records and (ii) branches connecting nodes of PA entities between which there is a functional dependence; and a computing device operational to execute a dependency assessment software program, wherein the dependency assessment software program is configured to: transmit, to a client device, information for displaying in a GUI of the client device the graphical representation of one or more of the respective PA entities, receive, from the client device, a first request for dependency information for a first PA entity from among the one or more respective PA entities, and responsive to the first request, transmit, to the client device, a graphical representation of a first portion of the dependency assessment tree depicting the first PA entity and both one or more dependency nodes corresponding to PA entities having a functional dependency relationship with the first PA entity, and connecting branches.

In a second example embodiment may involve a client device operable to configure a performance analytics (PA) system disposed within a computational instance of a remote network management platform that is associated with a managed network, the PA system being configured for processing and analysis of performance data of the managed network, the client device configured to: display, in a graphical user interface (GUI), a graphical representation of one or more PA entities, wherein a database of the remote network management platform contains a plurality of PA entity records, each PA entity record comprising data for configuring the graphical representation of a respective PA entity, wherein the respective PA entity is a component of the PA system configured for processing one or more key performance indicators (KPIs) of the managed network, and is implemented as at least one of a software component or a hardware system, and wherein each PA entity record further comprises information specifying a logical location of the respective PA entity in a dependency assessment tree, the dependency assessment tree comprising (i) respective nodes corresponding to the respective PA entities of the plurality of PA entity records and (ii) branches connecting nodes of PA entities between which there is a functional dependence; receive, via the GUI, input that selects a first PA entity from among the displayed one or more respective PA entities; responsive to transmitting, to a computing device disposed within the computational instance of the remote network management platform, a first request for dependency information for the selected first PA entity, receive a graphical representation of a first portion of the dependency assessment tree depicting the first PA entity and both one or more dependency nodes corresponding to PA entities having a functional dependency relationship with the first PA entity, and connecting branches; and display, in the GUI, the graphical representation of the first portion of the dependency assessment tree.

In a third example embodiment may involve a method for configuring a performance analytics (PA) system disposed within a computational instance of a remote network management platform that is associated with a managed network, the PA system being configured for processing and analysis of performance data of the managed network, the method operable on a computing device disposed within the remote network management platform, the method comprising: transmitting, to a client device, information for displaying in a graphical user interface (GUI) of the client device a graphical representation of one or more respective PA entities, wherein a database of the remote network management platform contains a plurality of PA entity records, each PA entity record comprising data for configuring the graphical representation of a respective PA entity, wherein the respective PA entity is a component of the PA system configured for processing one or more key performance indicators (KPIs) of the managed network, and is implemented as at least one of a software component or a hardware system, and wherein each PA entity record further comprises information specifying a logical location of the respective PA entity in a dependency assessment tree, the dependency assessment tree comprising (i) respective nodes corresponding to the respective PA entities of the plurality of PA entity records and (ii) branches connecting nodes of PA entities between which there is a functional dependence; receiving, from the client device, a first request for dependency information for a first PA entity from among the one or more respective PA entities; and responsive to the first request, transmitting, to the client device, a graphical representation of a first portion of the dependency assessment tree depicting the first PA entity and both one or more dependency nodes corresponding to PA entities having a functional dependency relationship with the first PA entity, and connecting branches.

In a fourth example embodiment, a system may include various means for carrying out each of the operations of the third example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
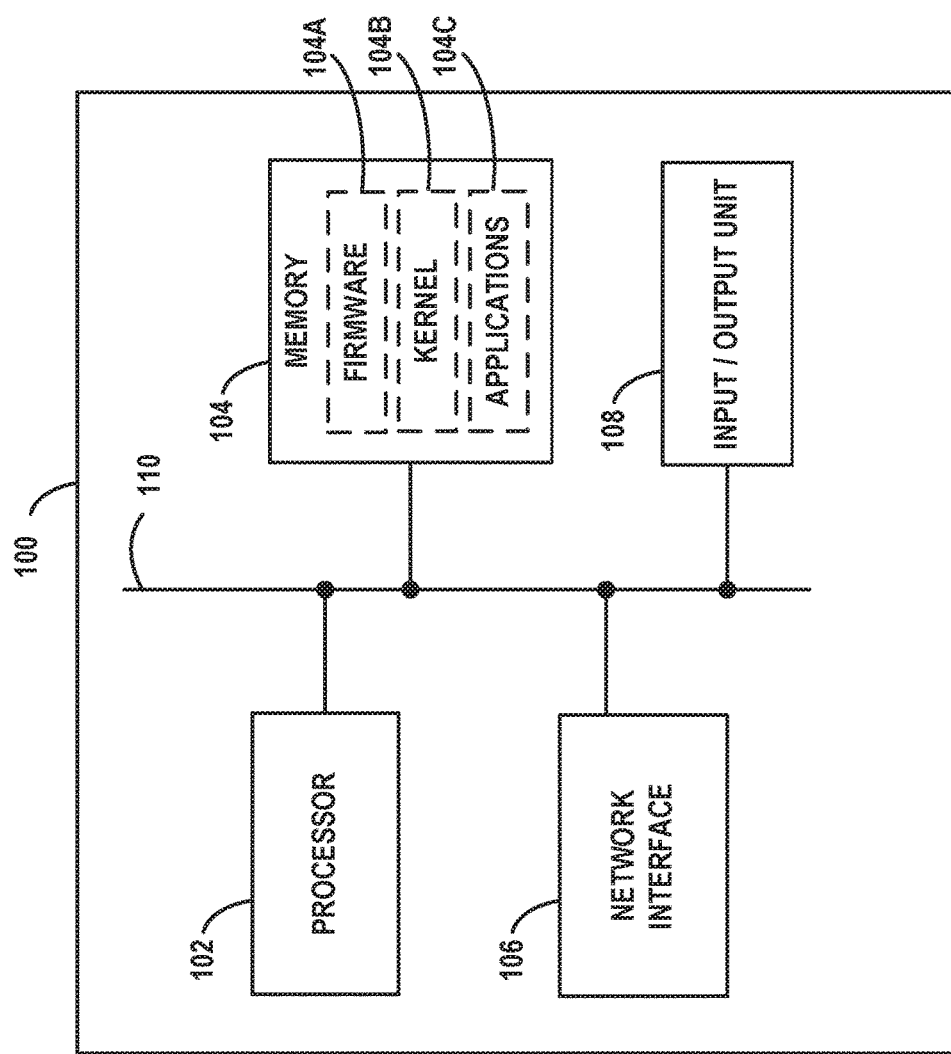
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
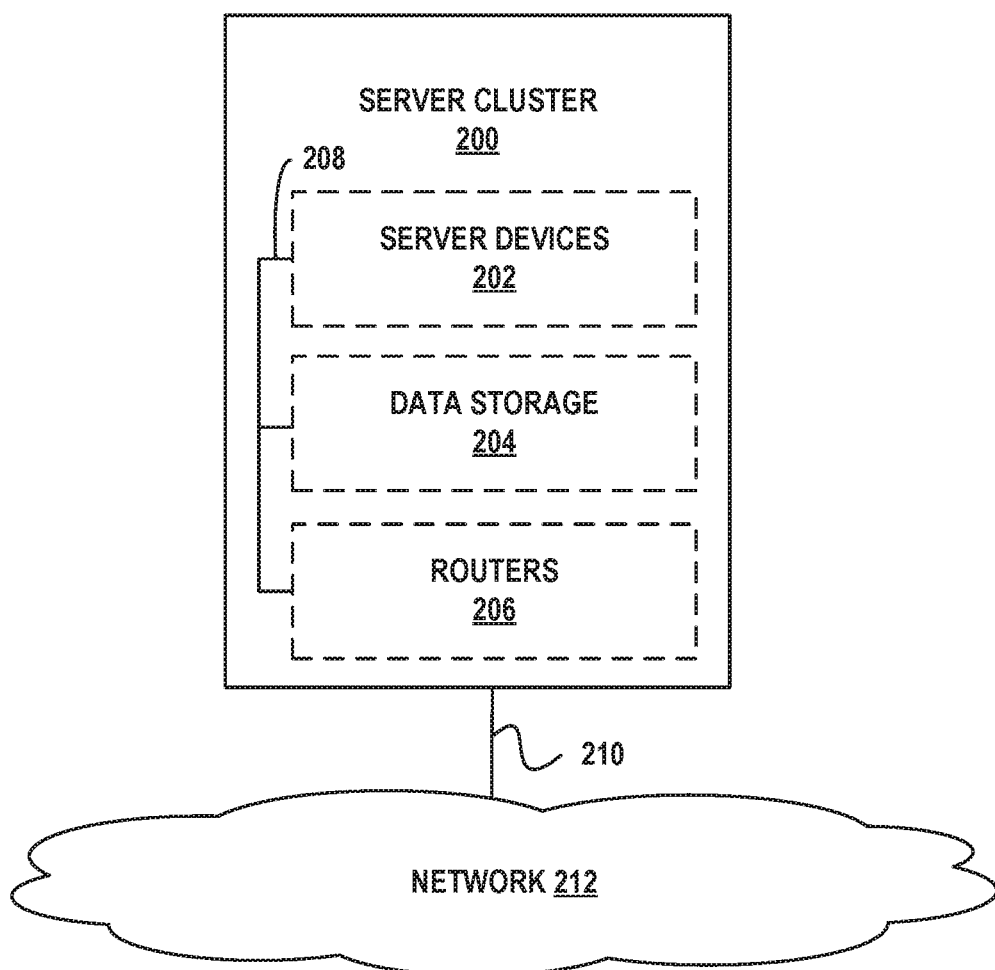
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
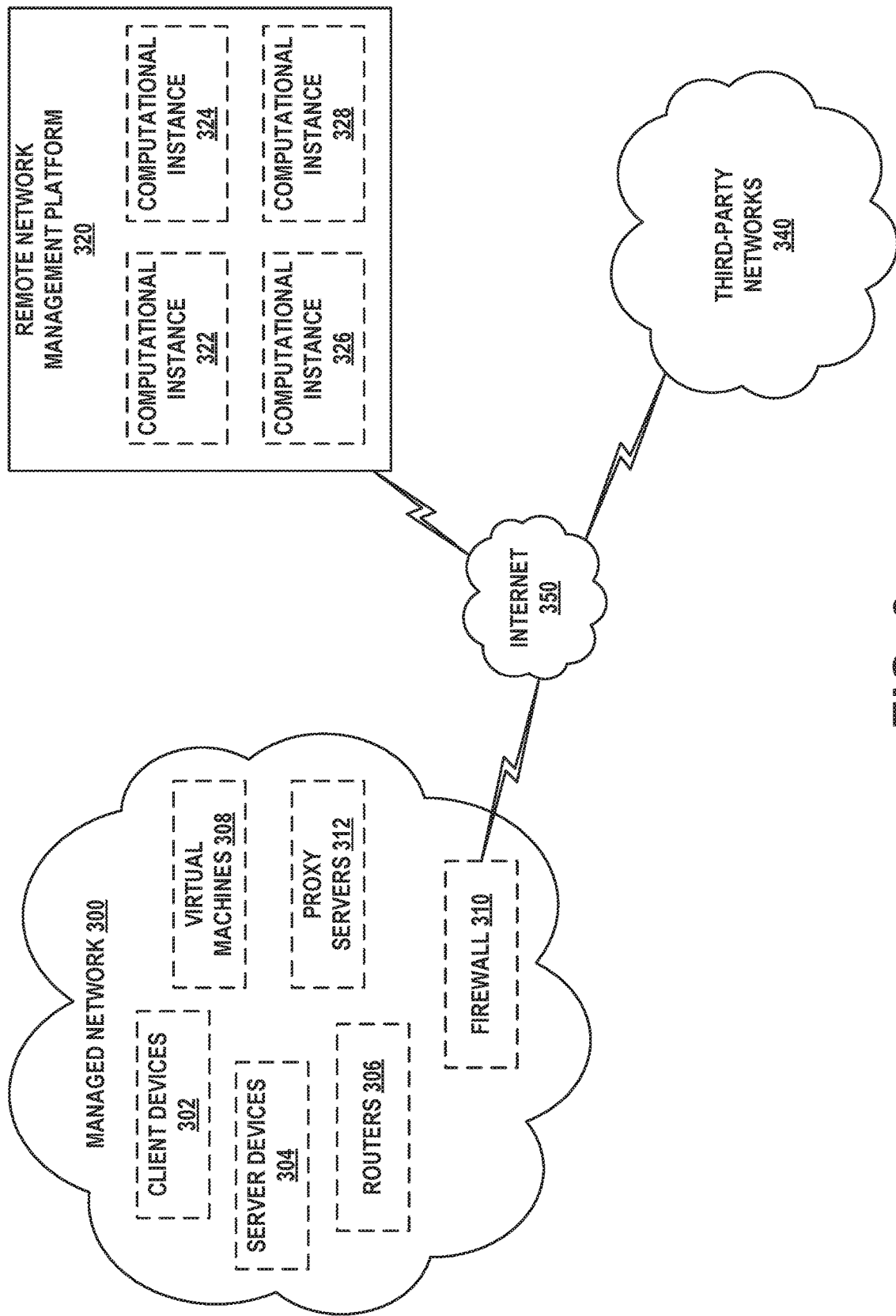
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
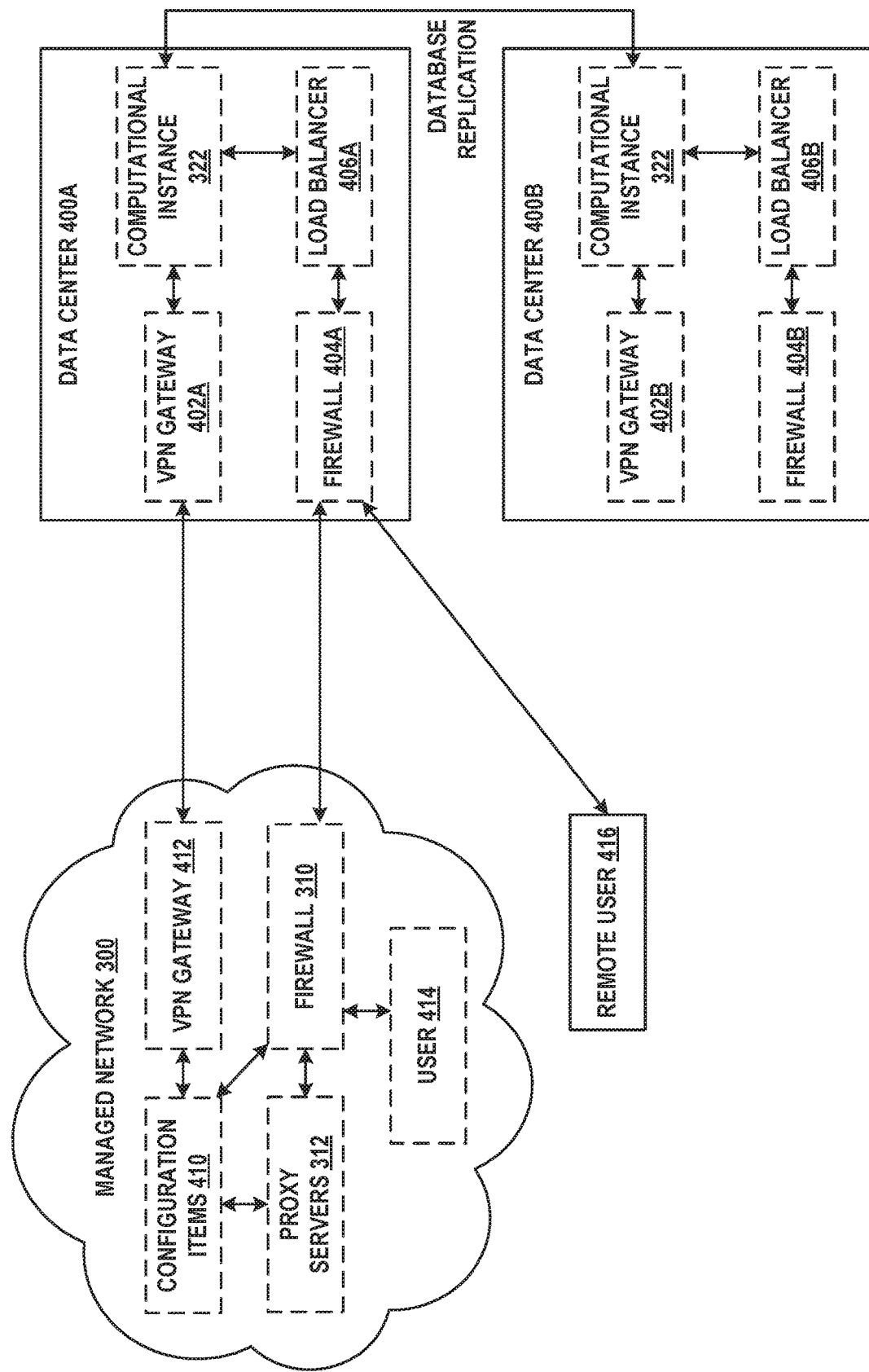
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
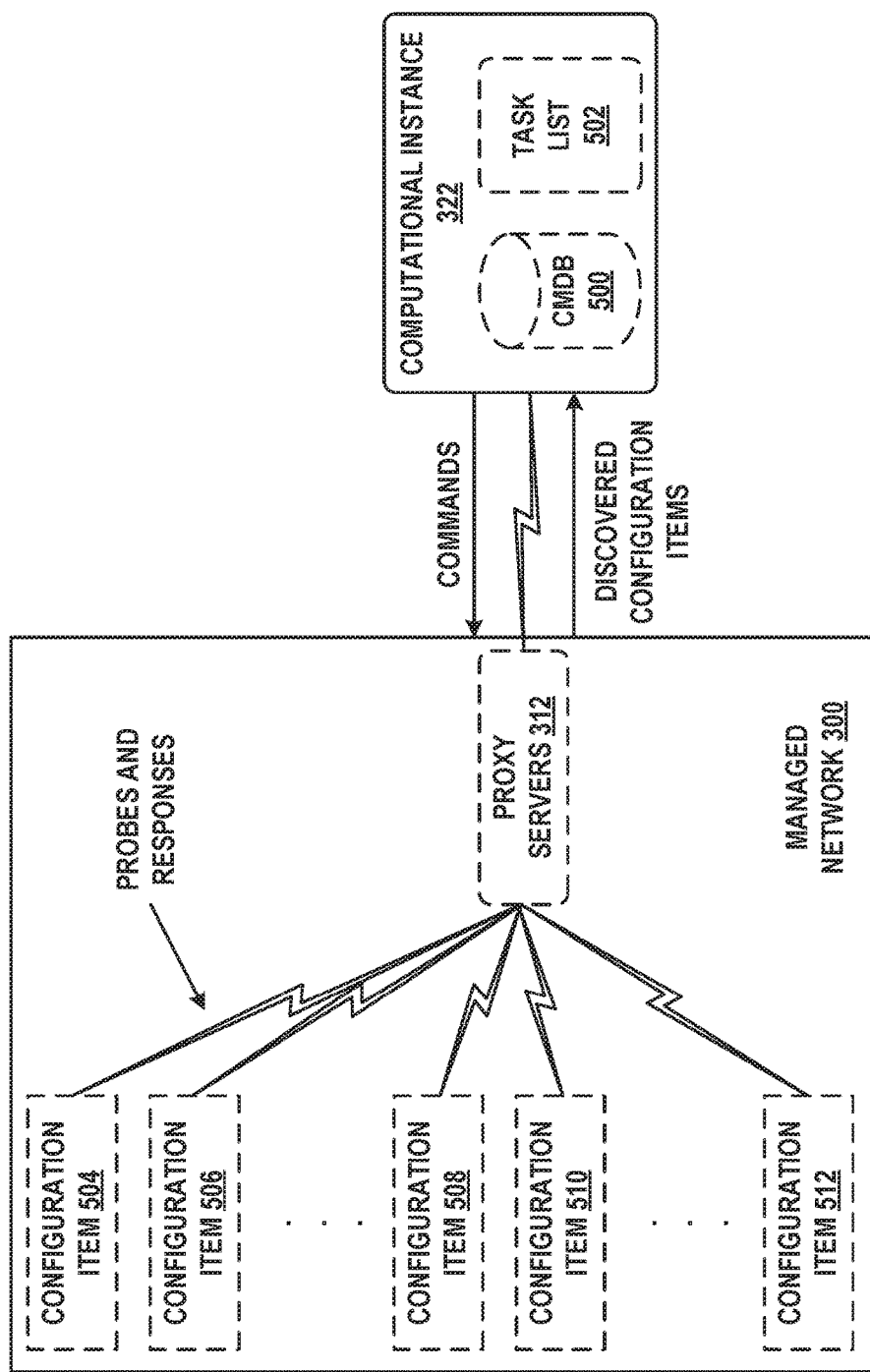
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
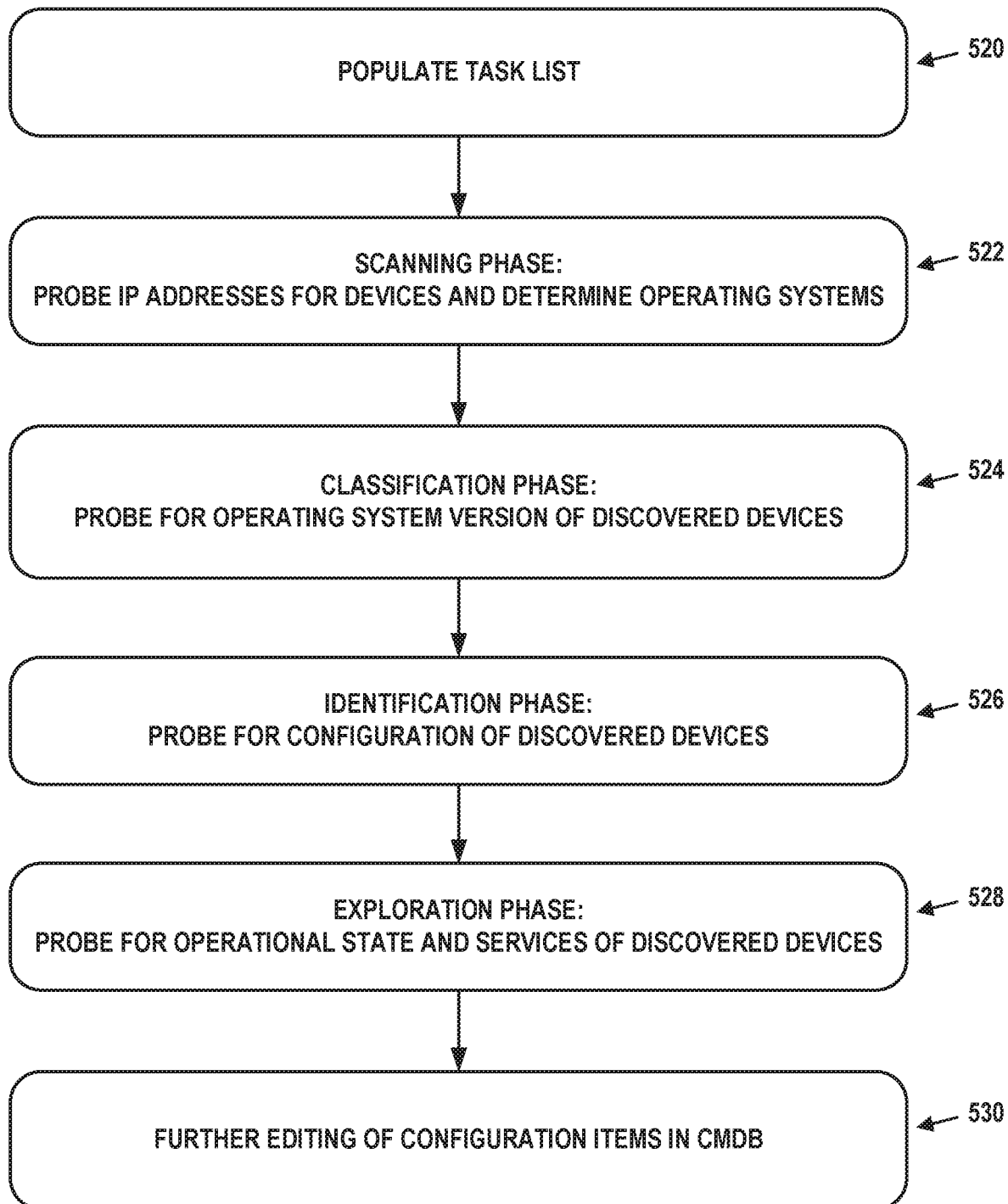
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE PERFORMANCE ANALYTICS VISUALIZATIONS

As described herein, a visualization may take various forms and be made up of one or more of various "PA elements" or "PA entities." Generally, visualizations typically involve the presentation of KPIs in a graphical format. The term PA entity is used herein to describe both a specific or general graphical function or operation, as well as a PA function, operation, or definition. For example, a widget may describe a graphical component configured for displaying a data plot and providing graphical or textual control elements for allowing a user to adjust appearance, data range, etc., of a KPI display. As another example, a breakdown may be a definable filter that can be applied to measurement data, and may have one or more associated graphical elements for creating and adjusting breakdown parameters (breakdowns are discussed in more detail below). These are just two examples. Other, non-limiting examples of PA entities include dashboards, tabs, scorecards, and databases.

KPIs, which, as noted, may themselves be considered PA entities, may also be referred to as metrics or indicators. In general, KPIs are a type of performance measurement used to evaluate current and past conditions, as well as to forecast trends. KPIs can be used to evaluate the success of a particular activity, such as making progress toward strategic goals or the repeated achievement of some level of operational goal (for example, zero defects, a mean time to resolution of less than 24 hours for certain types of IT issues, or less than 70% processor utilization on a particular server device). KPIs can also be used to measure and/or track an organization's mission. In this context, KPI could be associated with sales, inventory, or other mission-related performance measures.

The act of measuring a KPI may be referred to as collection. KPIs are associated with one or more KPI sources that define one or more fields in a database table (sometimes called a facts table) that are to be collected in order to provide the KPI data. KPI sources may also specify filters to include only a subset of the information in a field. KPI data—e.g., measured or collected data—may be stored, possibly with other KPI-related and PA-related data, in the database. The database for these data is referred to herein as a PA database.

Data measurements associated with a KPI are also referred to herein as "scores." With this terminology, a KPI—either as a PA operational entity or as a graphical operational entity—may also be considered as a descriptor or specification of an indicator, while the corresponding scores are actual measurements collected as specified by the descriptor. For example, a KPI may be defined or created for tracking processor utilization on a particular server. The KPI may also define time windows for data collection and frequency of measurements during the time windows, as well as possibly other filters that may be applied during data collection. The scores for the KPI may then be the utilization measurements collected during the specified time windows at the specified collection or measurement frequencies. The scores may then be collected in records in the PA database. This is just one non-limiting, and simple, example of KPI scores. Other, more complicated KPI definitions and scores are possible as well. As described below, scores may be collected and displayed in scorecards.

A dashboard is single-screen GUI component that contains one or more tabs that logically group components that generally belong together. In some embodiments, a dashboard may be equivalent to or contained within a GUI window. Tabs may be graphical control elements that allow multiple documents or panels to be contained within a single dashboard. Tabs can be used to switch between such documents or panels. Individual GUI widgets may be present on such tabs. In the context of PA, these widgets may display a KPI as a latest value, a time series, in a chart, in a speedometer, in a dial, in a scorecard, or in a column. Other variations are possible.

Breakdowns are PA entities that allow organization and filtering of KPI data on tabs and dashboards. Thus, breakdowns apply organization and/or filtering to KPI score data—i.e., after KPI data (scores) have already been collected. This may be distinguished from filters and other collection criteria defined as part of a KPI and applied as part of, or during, data collection. In some embodiments, breakdowns may take the form of a drop down GUI widget. Regardless, the KPI data can be divided in various ways based on category. For instance, IT trouble ticket incidents can be divided by priority or by originating department. In some cases, breakdowns can use these multiple ways of dividing data in tandem, such as breaking down IT trouble ticket incidents first by priority, then by originating department.

A scorecard can be a dashboard, tab, or widget that displays data related to a single KPI (e.g., in a time series chart widget) and enables detailed analysis of this data. In some embodiments, each KPI may have an associated scorecard that is automatically created. The data may be viewed by breakdown and/or in aggregate (e.g., counts, sums, and maximums of the values). Scorecards may also provide ways of viewing the database fields on which the KPI values are based.

Any of these elements or entities (dashboards, tabs, widgets, breakdowns, and scorecards) may be considered a visualization, or components thereof, and can be user customized. For instance, a user can rearrange the tabs of a dashboard, add or remove widgets from a tab, and create new breakdowns. The appearance of a dashboard, such as what tabs and/or widgets are included, what formats of visualization are included, data ranges, etc., may be determined by one or more configuration settings. In some example embodiments, configuration settings, or just "configuration" for short, may be defined by various data elements and entities, including data tables, data records, variables, parameters, and the like, which can be stored in memory and used to control the content and appearance of the visual, analytical, and interactive components that make up a dashboard. Setting and adjusting values of the data elements and entities allows the appearance and function the dashboard to be set up, as well as adjusted or tuned.

Figure 6A:
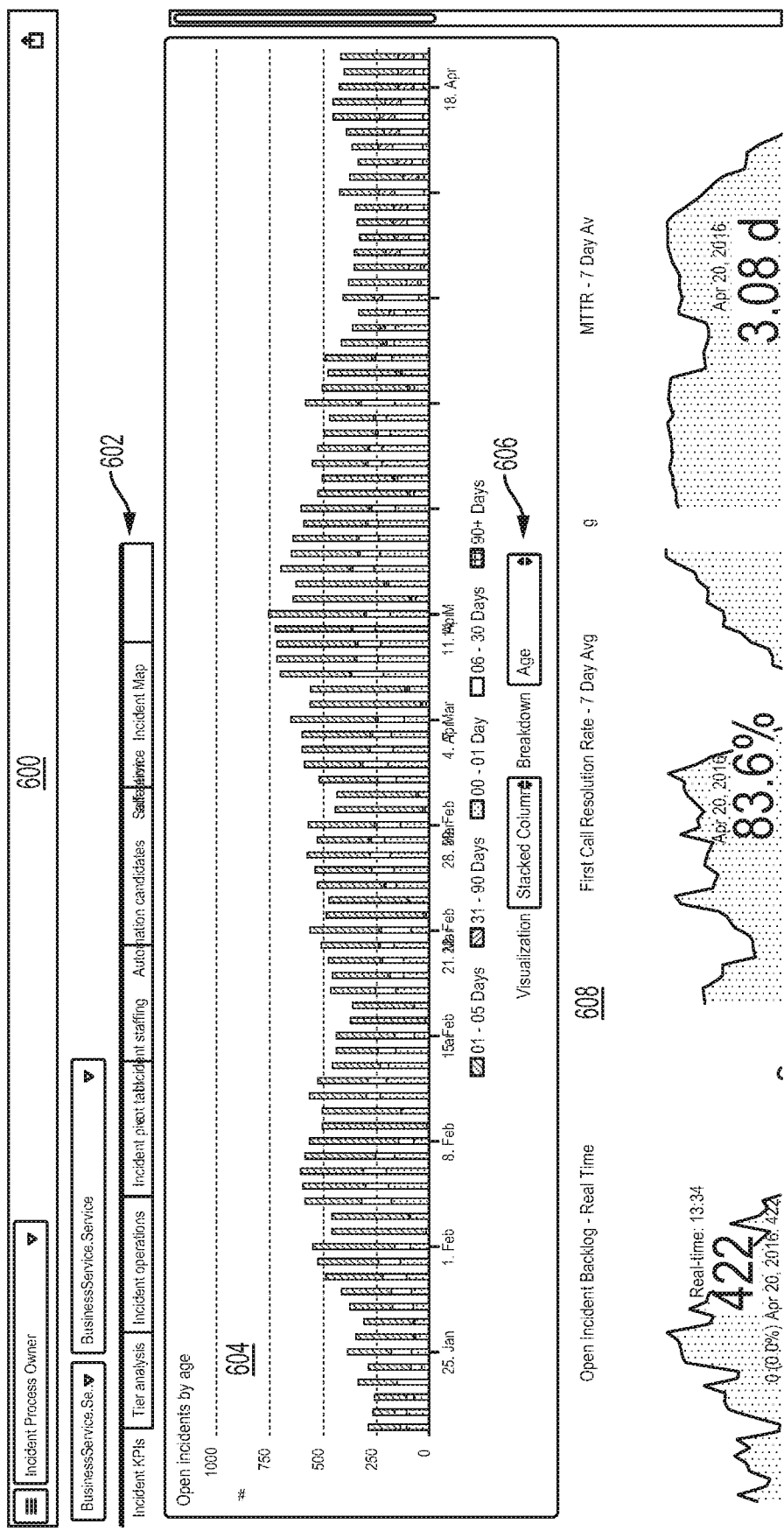
FIG. 6A depicts a performance analytics dashboard in the form of a graphical user interface, in accordance with example embodiments.
Figure 6B:
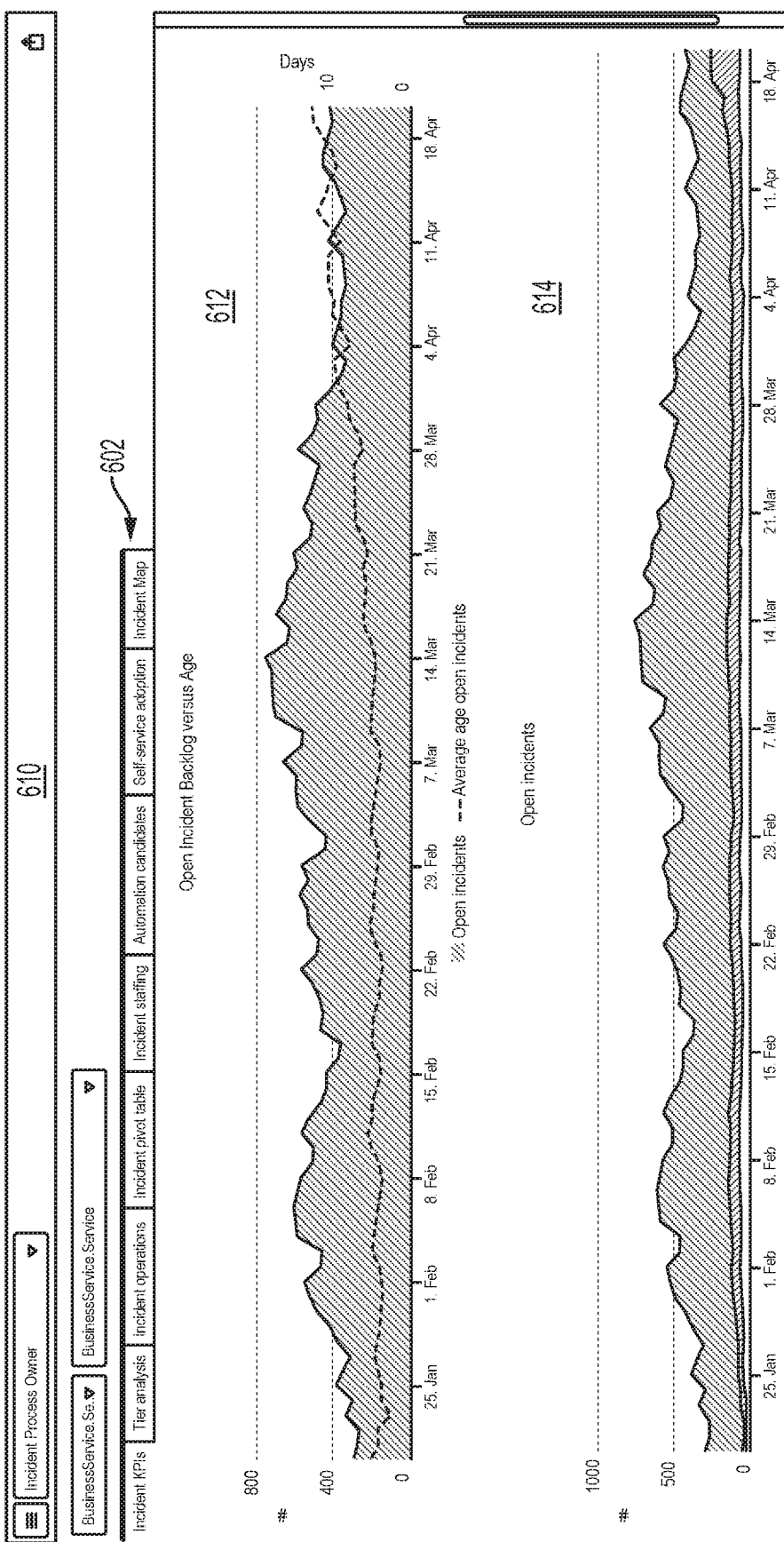
FIG. 6B depicts a performance analytics dashboard in the form of a graphical user interface, in accordance with example embodiments.

Example dashboards are shown in FIGS. 6A and 6B. Dashboard 600 of FIG. 6A includes multiple tabs 602, such as an "Incident KPIs" tab, a "Tier analysis" tab, and so on. The "Incident KPIs" tab is displayed, and includes a widget in the form of a bar chart 604, titled "Open incidents by age". Bar chart 604 plots, for each day of an approximately three-month time period, the total number of open incidents for the age ranges of 0-1 days, 1-5 days, 6-30 days, 31-90 days, and over 90 days. These age ranges may be defined by the "Age" category of breakdown 606.

These incidents may be, for example, trouble tickets or help requests opened with an IT organization. Each incident may therefore involve a particular problem that a user has experienced, such as a computer crashing, a user being unable to log on to a service, slow performance of a service, a request for new equipment, and so on. The IT organization may track its performance by measuring how long it takes to resolve the incidents. For example, bar chart 604 suggests that there were fewer open incidents near the end of the time frame than at the middle of the time frame, but that the incidents near the end of the time frame had remained open for a longer duration (i.e., there were more open incidents in the 31-90 days age range).

Dashboard 600 may also include section 608, which includes three widgets for: the extent of the open incident backlog (in this case, there are 422 open incidents currently), the first call resolution rate (in this case, 83.6%), and a seven-day running average of the mean time for an incident to be resolved (in this case, 3.08 days). This latter KPI may also be referred to mean time to resolution, or MTTR.

Dashboard 610 of FIG. 6B shows different example visualizations related to open incidents. This dashboard contains the same tabs 602, but includes charts 612 and 614 instead of bar chart 604 and section 608. Chart 612 plots, for the same time frame of the visualization in FIG. 6A, open incidents against the average age of these open incidents on a dual y-axis graph. Chart 614 also plots open incidents, but includes representations of the age distribution of these incidents.

Dashboards 600 and 610 also include various selectors, such as breakdowns in the form of drop down menus that allow the user to view these KPIs in different ways. Regardless of their exact mechanisms, these dashboards allow the user to rapidly determine the status of the organization's incident response KPIs through the use of visualizations that combine these KPIs.

The data displayed in bar chart 604, section 608, chart 610, and chart 612 may be visualizations defined by a data model. Thus, information defining these visualizations may be stored in a database according to that data model. The information may also be identified as representing one or more KPIs, and each KPI may be represented as one or more tables in the data model. As demonstrated in FIGS. 6A and 6B, multiple visualizations may use the same KPIs to provide different views of the represented data.

VI. DEPENDENCY ASSESSMENT OF PA ENTITIES

In general, the potential number of KPIs for an enterprise or other organization can be quite large, numbering in the 100s to tens of 1,000s. In practice, KPIs can be highly interrelated and connected, such that data feeding a metric for one KPI may be the output data from another KPI or multiple other KPIs. For example, a KPI metric relating to number of overdue budget reports may directly affect a KPI measuring percent of expenses spent on late fees which in turn may directly affect a KPI measuring yearly operating expenses. Consequently, relationships between KPIs and between PA entities can be complicated.

As a further illustration of the relationships between KPIs and other PA entities, consider the example of changing the output data type of a first KPI, such as seconds to minutes. Such a change could cause an error to a second KPI that uses such data as input, which may subsequently affect a dashboard that uses the second KPI. In a large enterprise, it may be difficult for a user or administrator to identify how user changes directly affect KPIs and associated PA entities if relationships between KPIs are undefined or unknown.

Yet, as described above, PA entities may be modified or updated from time to time as a matter of routine practice. For example, new versions may be released to update capabilities. In addition, PA entities may be modified by a user or administrator in order to customize KPI visualizations, as described above. There may be other reasons or causes for modifying PA entities, as well. Considering the functional relationships of the various types of PA entities—e.g. tabs in dashboards, widgets in tabs, KPI settings, and multiple types of data collected—it may be expected that some of the types of modifications to a PA entity can have the potential to impact stability and/or validity of the behavior of other PA entities. Accordingly, functional dependencies between PA entities need to be taken into account when one or more PA entities are modified. In a system having a large number and type of PA entities, the possible number and complexity of functional dependencies between PA entities may therefore present a challenge to the ability to support user and/or administrator modification to PA entities and KPI visualization within a PA system.

Still further, a user of a PA system program may want to adjust a database table or entries within a table that are relied on for KPI data collection in order to change how a particular KPI is measured. In other cases, a user may want to refine conditions or apply data filters to modify the subset of information for a particular KPI.

Example embodiments herein provide systems and methods for avoiding errors that might otherwise occur as a result of modifying PA entities—errors that could cause the KPI and/or any associated performance analytics (PA) entities to fail. More particularly, identification of interrelationships and dependencies between KPIs for PA operation may be extended for mapping of functional interrelationships and dependencies between PA entities.

In the context of an organization's mission, for example, it is known to use KPIs to evaluate strategy and measure how well performance is tracking goals. Interrelationships and dependencies between mission-oriented KPIs may also help assess how adjustments to goals or results in one area may impact another. One technique for quantifying dependencies among KPIs is to construct a "KPI tree." As described herein, a KPI tree is a hierarchical graph structure used by an enterprise or other organization to manage KPIs. KPI trees group KPIs into specific target areas, which in turn may be grouped more broad organizational themes. Within such a tree structure, an organization can identify how KPIs affect one another, as well as how they directly affect overall goals. A variety of tree structures may be created to address different organizational needs.

In accordance with example embodiments, KPIs may be used with a PA system to track a variety of aspects of network operations and overall performance of a managed network, such as network 300. Also in accordance with example embodiments, the PA system may include a KPI tree to quantify and describe interrelationships and dependencies between KPIs of the PA system. The KPI tree may thus provide the framework for evaluating how different functional elements of a network are operationally connected in terms of performance. This aspect of a KPI tree may largely follow conventional usage. Harnessing the hierarchical representation of a KPI tree in the context of a PA system thus provides a versatile way of monitoring and managing network performance.

The inventors have recognized that, beyond its conventional usage, a KPI tree, by its nature, incorporates mappings of many of the very types of functional interrelationships and dependencies between PA entities that pose challenges to management of changes and revisions of PA entities described above. That is, the same KPI tree (or trees) used to support tracking and monitoring of network performance and operations via KPIs in a PA system can be used—possibly with some extensions or enhancements—for real-time assessment of the impact of changes to PA entities on functional performance of the PA system itself. Thus, using a KPI tree to map functional dependencies between PA entities may help make updating and/or customization of PA entities more robust against dependency-related errors, while ensuring predictable functional outcomes of such changes. As such, users and/or administrators may make changes to PA entities without having to directly or explicitly navigate the complexities of the functional dependencies.

In accordance with example embodiments, dependencies between PA entities of a PA system may be represented graphically as a "dependency assessment tree," which may be derived from a KPI tree. The dependency assessment tree may present a graphical representation of dependency mappings between PA entities, and may further include GUI-based interactions and controls for graphically exploring the hierarchy of dependencies among user-selected PA entities and assessing the effect of modifications to PA entities in the tree. Graphical controls may include interactive functions, such as drop-down menus, point-and-click selection, and editing actions, for graphically displaying dependencies and graphically identifying how changes to PA entities may ripple across dependencies.

In further accordance with example embodiments, graphical representation may account for a possibly limited screen size of computing devices used by users to review configuration item information. More particularly, a streamlined layout may be used that hides portions of mappings, but not hiding indications of hidden portions. Thus, a user may be made aware of non-displayed portions of a larger dependency mapping, and given the option to explore them.

Figure 7:
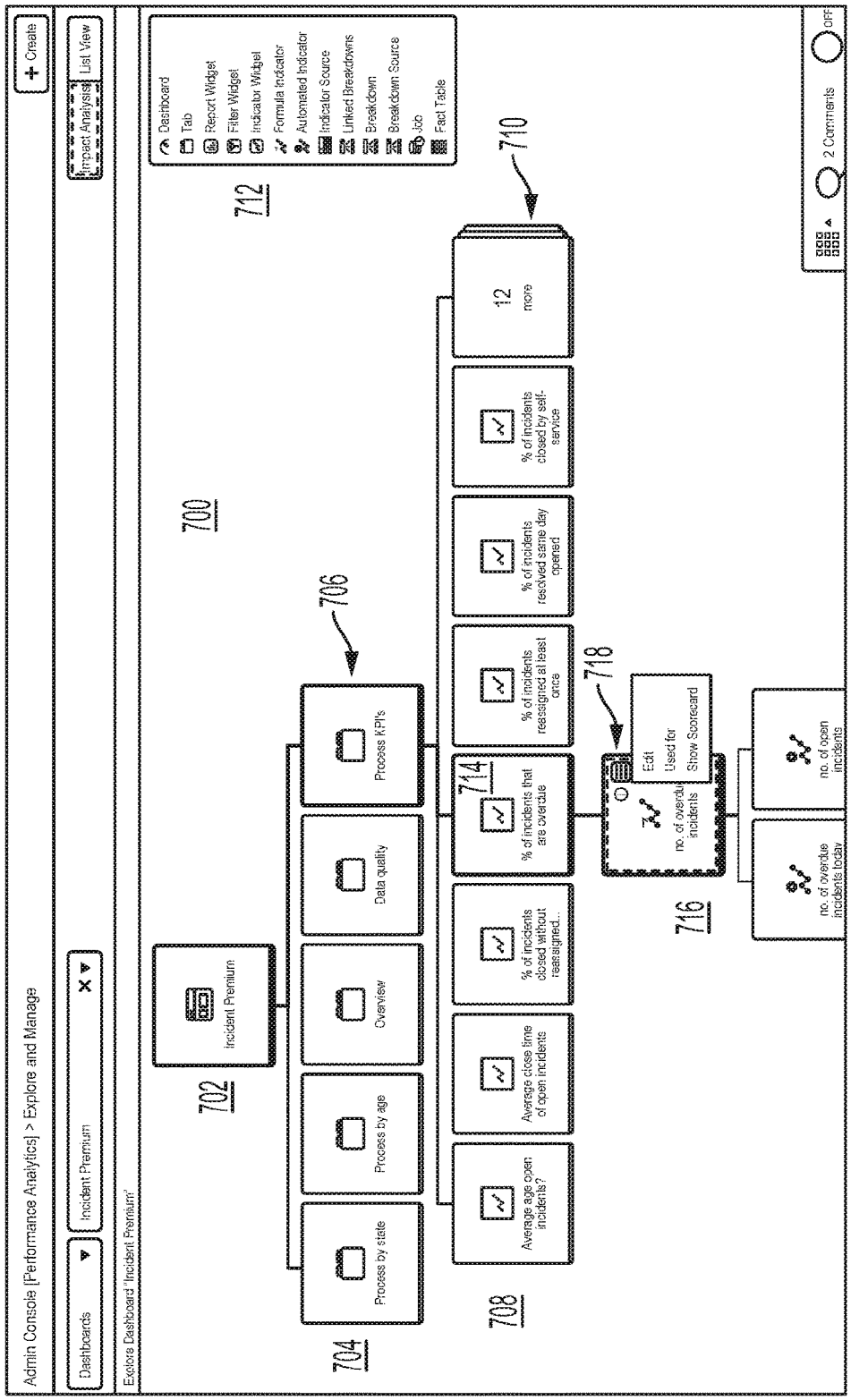
FIG. 7 depicts an example view of an example dependency assessment tree, in accordance with example embodiments.

FIG. 7 illustrates an example dependency assessment tree 700. Dependency assessment tree 700 includes nodes, which represent vertices in the tree, and branches, which represent edges between the nodes. In example embodiments, a node on dependency assessment tree 700 corresponds to a PA entity of a PA system. For example, dependency tree 700 may include top level node 702, which represents an incident dashboard similar to that of dashboard 600. Below top level node 702, second level nodes 704 are shown and may represent tabs similar to the multiple tabs 704 that are displayed in dashboard 600. Accordingly, the hierarchical structure of branches in dependency assessment tree 700 can be used to indicate how an incident dashboard relies on tabs during operation. In the example embodiments, a level may refer to how many branches a group of nodes are located from a root node of a tree. As such, higher level nodes on dependency assessment tree 700 may represent more expansive performance analytics entities whereas lower level nodes may represent smaller entities that are typically contained within the larger entity. Thus, a given level of the dependency assessment tree 700 may be contained within a PA entity that exists above the level above, and PA entities at the given level of dependency assessment tree 700 may contain entities in the level below the given level.

For purposes of the discussion herein, and consistent with descriptions of example embodiments, if a first PA entity depends on any second PA entity second PA entity, the first PA entity is referred to as a parent and the second PA entity is referred to as a child. Note that a parent PA entity may have multiple children that it depends on. For example, process KPI node 706 may have multiple children that it depends during its own operation. These dependencies can be seen third level nodes 708 displayed below second level nodes 704. Thus, third level nodes 708 are the children of process KPI node 706 and process KPI node 706 is the child of top level node 702.

In example embodiments, dependency assessment tree 700 may be configured to display only a limited portion or segment of the entire dependency assessment tree based on user actions. A limited portion of a larger dependency assessment tree may be referred to as a tree view. For instance, if a user is only concerned with process KPIs, the user may click on process KPIs node 706 to filter out the branches extending from the remaining second level nodes 704. Dependency assessment tree 700 may be configured allow filtering to be applied to any node on any level of the tree in order to obtain a desired tree view. Tree view configuration allows the dependency assessment tree 700 to be displayed to users with limited screen size without unduly crowding the graphical user interface. Additionally, dependency assessment tree 700 may be configured have a default tree view display. For example, when first accessing dependency assessment tree 700, a user may only see a tree view with top level node 702 and second level nodes 704.

In some usage scenarios, a parent PA entity may contain a large number of children nodes, as seen by way of example in third level nodes 708. Instead of overcrowding the GUI with a wide display of all children nodes for a given parent, dependency assessment tree 700 may be configured to only display a smaller number of children to a user and group the remaining child nodes into a single, expandable node, as seen by the expandable node 710, labeled "more." The expandable node may be configured to display the number of child nodes that are hidden from the view. To access these hidden nodes, a user could click on expandable node 710 to reveal a list of the hidden children nodes.

When presenting a dependency assessment tree to user, a PA system may further be configured to correlate dependency assessment tree nodes and general performance analytics types. For example, performance analytics types may include tabs, formula indicators, breakdowns, or dashboards. Other types may also be available. Thus, a PA system may create and display a legend to associate a performance analytics type with a node on the dependency tree via a UI icon. For example, legend 712 may be displayed alongside dependency tree 700. Each node in dependency tree 700 may have an icon that is associated with a piece of text on legend 712 to enable a user to easily identify performance analytics types. In example embodiments, causing a cursor to hover over, or click on, a node in dependency tree 700 may cause the node's performance analytics type may be highlighted in legend 712.

To allow a user to quickly identify KPI dependency relationships, the example embodiment may display a dependency path in response to selection of a node. For instance, clicking a cursor or other interactive selection graphic on node 706, a path through tree branches or edges on dependency assessment tree 700 may be highlighted to display the higher level nodes 702 that depend on node 706. Subsequently, a user may click on nodes 714 and 716 to further extend the dependency path through dependency tree 700. Thus, if a user was considering modifying data source feeding into node 716, they can quickly identify a chain of potential nodes and performance analytics entities that may be affected by the change.

Dependency assessment tree 700 may also configure clickable icons on nodes to provide users with easy information access and interactive options for the associated PA entity. For example, options menu 718 may be displayed when a user clicks or hovers over node 714. A user may be able to view a summary on a PA entity associated with node 716 via the info icon alongside the options menu 718, edit the configuration of the PA entity with the "Edit" option, show the scorecard of the PA entity with the "Show Scorecard" option, or display what node 716 is "Used for" on dependency assessment tree 700. In the illustrated example, the "Used for" option may display a bottom-up tree view, as described below. Other interactive options and action may also be included in dependency assessment functions and operations.

In accordance with example embodiments, a PA system may be configured to update a dependency assessment tree in real time. For example, if a database that is an indicator source goes down due to a power outage, a dependency assessment tree may display an error message on all nodes representing PA entities that are affected by the database error. In another example, if a PA entity is removed from the PA system, the deletion may be reflected in the dependency tree immediately by removing the associated node from the dependency assessment tree. In some embodiments, the current tree view of a dependency assessment tree may be persistent. If a user decides to navigate away from the dependency assessment tree and then returns back, the dependency assessment tree would display the same tree view that the user left when navigating away.

Also in accordance with example embodiments, a PA system may provide access to a dependency assessment tree 700 via a client device, such as client device 302, through a variety of methods available to a user of the client device. In some usage scenarios, the dependency assessment tree may be launched as an individual application via a link on a context menu or dashboard record. In other scenarios, the dependency tree may be part of an administrative console, for example as a default tab or web page, for example.

Figure 8:
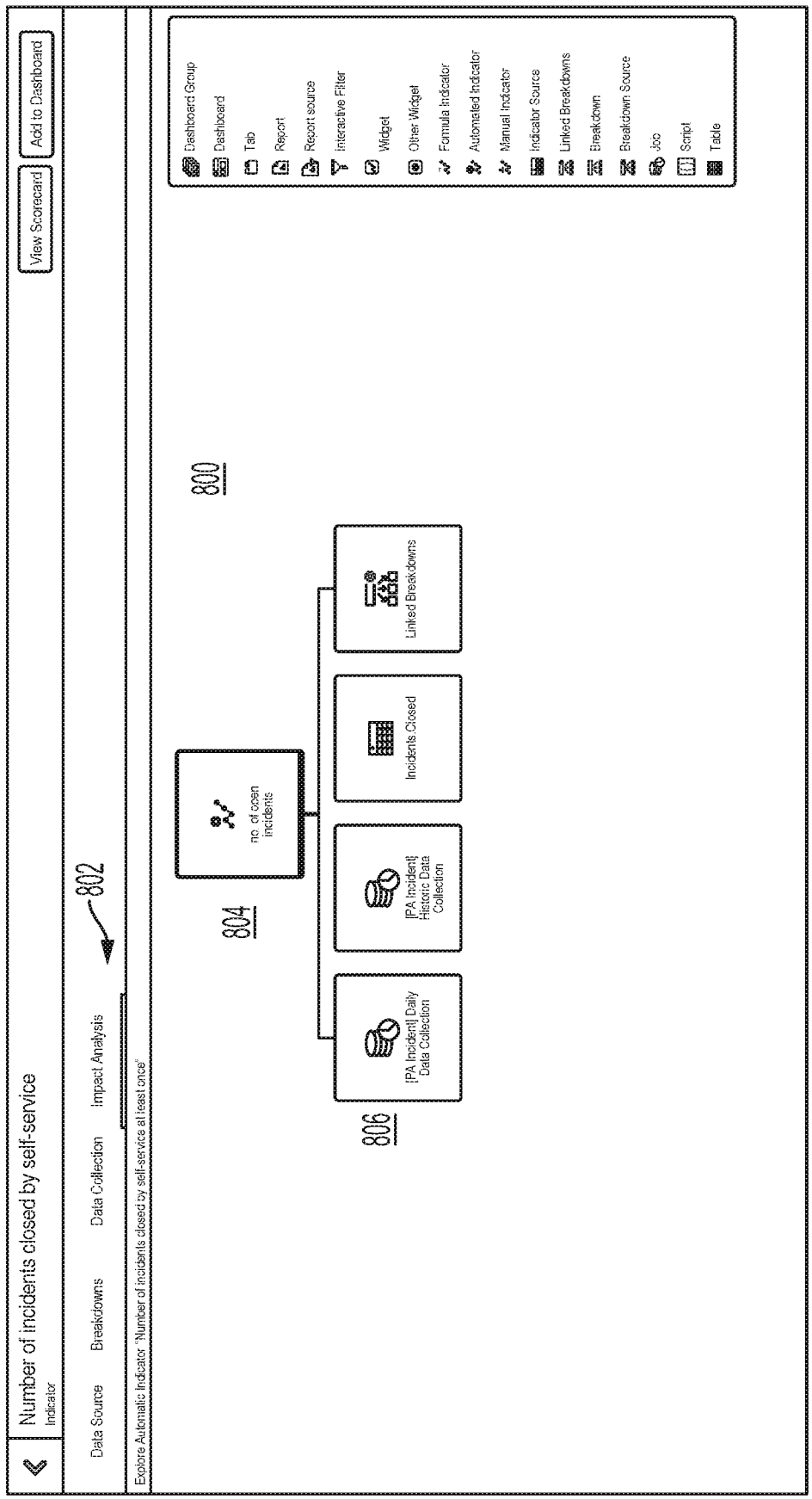
FIG. 8 depicts an example top-down view of an example dependency assessment tree, in accordance with example embodiments.

In other usage scenarios, the dependency assessment tree may be a part of a display tab when a new performance analytics indicator is created by a user, as illustrated by way of example in FIG. 8. In example operation, a user may click on impact analysis tab 802 to directly identify dependencies of a new indicator 804 in an indicator tree 800. In the example embodiments, a user can visually identify all breakdowns, indicators sources, and jobs that may be associated with the new indicator 804 by clicking or selecting appropriate functions or graphical buttons (e.g., impact analysis tab 802). In an example usage scenario, the dependency assessment tree may be limited in scope to the indicator and any nodes that the indicator depends on and features for selecting other nodes may be disabled.

In further accordance with example embodiments, a dependency assessment tree may be configured to display multiple types of tree views in the GUI of a client device. One type of view is a "top-down" tree view, as illustrated by indicator tree 800 in FIG. 8. A top-down tree view may show components of a PA entity in a hierarchical view with the PA entity at the top of the hierarchy. For example, if a user launches dependency assessment tree for a dashboard, the top-down tree view may show nodes for each of the dashboard tabs. If a user selects a dashboard tab, the tree view may then expand to show nodes that represent each of the widgets on the dashboard. Thus, in example operation, a top-down view of a PA entity may be generated in response to a GUI-based selection of the PA entity. An example of such a GUI-based selection is single- or double-clicking on the PA entity.

Figure 9:
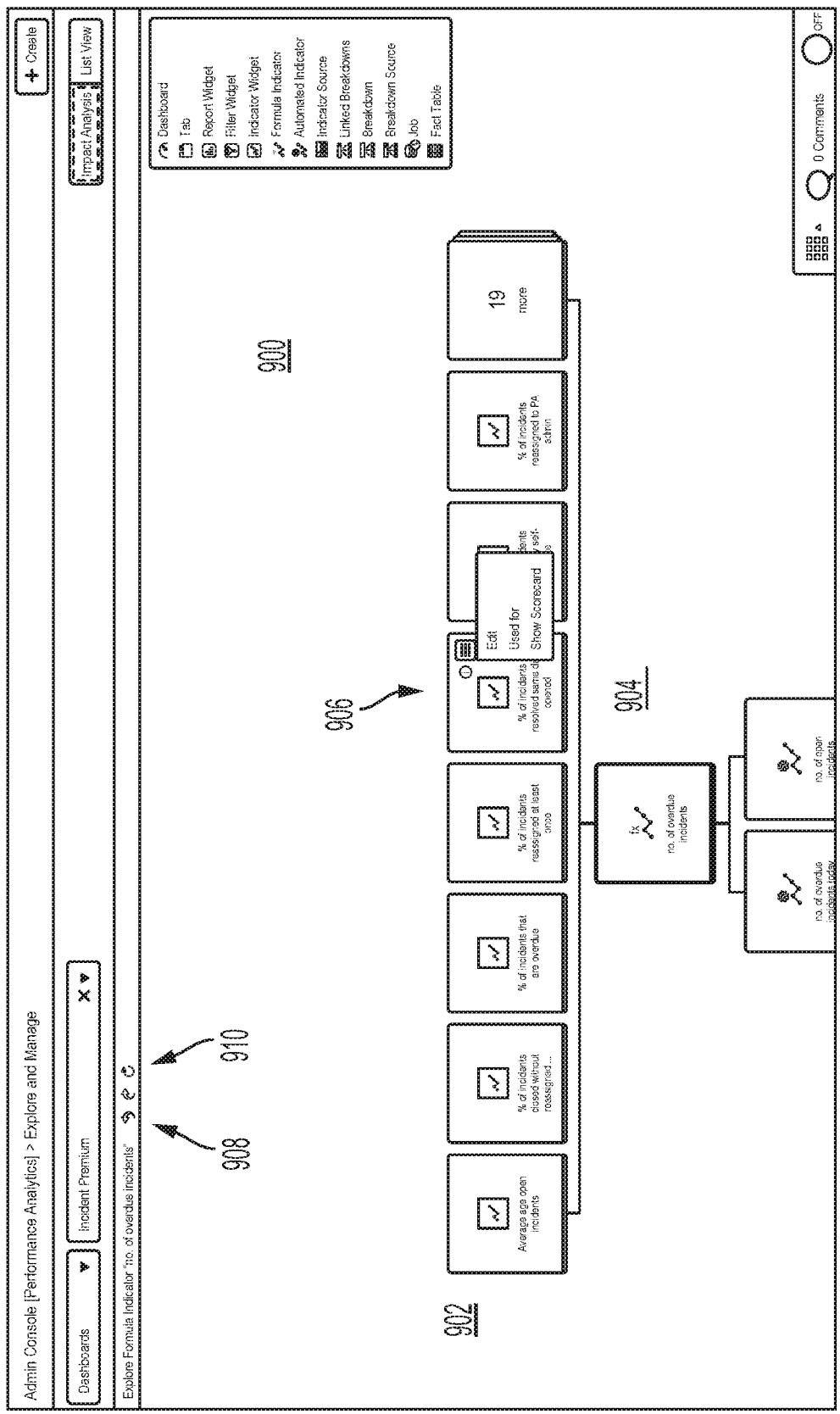
FIG. 9 depicts an example bottom-up view of an example dependency assessment tree, in accordance with example embodiments.

A dependency assessment tree may also contain a "bottom-up" tree view, as illustrated by dependency tree 900 for the PA entity 904 in FIG. 9. A bottom-up tree view may display how a node corresponding to a PA entity is being used by other nodes on the dependency assessment tree. For example, the PA entity 904 is a dependent node of PA entities 902; that is, each of the PA entities 902 depends on—or uses—the PA entity 904. It may therefore be immediately assessed from the dependency tree 900 that a modification to the PA entity 904 may affect or impact operation of any or all of the PA entities 902. As also illustrated in FIG. 9, the right-most node of PA entities 902 indicates 19 additional nodes that are hidden from the current view. This illustrates an example of hidden nodes.

In further accordance with example embodiments, a GUI of a client device may generate a bottom-up view in response to a particular cursor-based selection and/or option. For example, returning to FIG. 7, a user may hover a cursor over a PA entity 716, click to access a drop-down menu, and then select an option, such as the "Used for" option illustrated in the option drop-down menu 718. In response, a bottom-up tree view 900 may be generated for the PA entity 716 (relabeled in FIG. 9 as PA entity 904).

In the example embodiments, a dependency assessment tree may provide an undo button to revert back to the previous tree view. For instance, clicking on undo button 908 would result in returning to tree view 700. In addition, a dependency assessment tree may provide a reset button 901 to return the tree view to a predefined starting point, such as a the first level parent 702 and its immediate child nodes 704 as shown in FIG. 7.

Figure 10A:
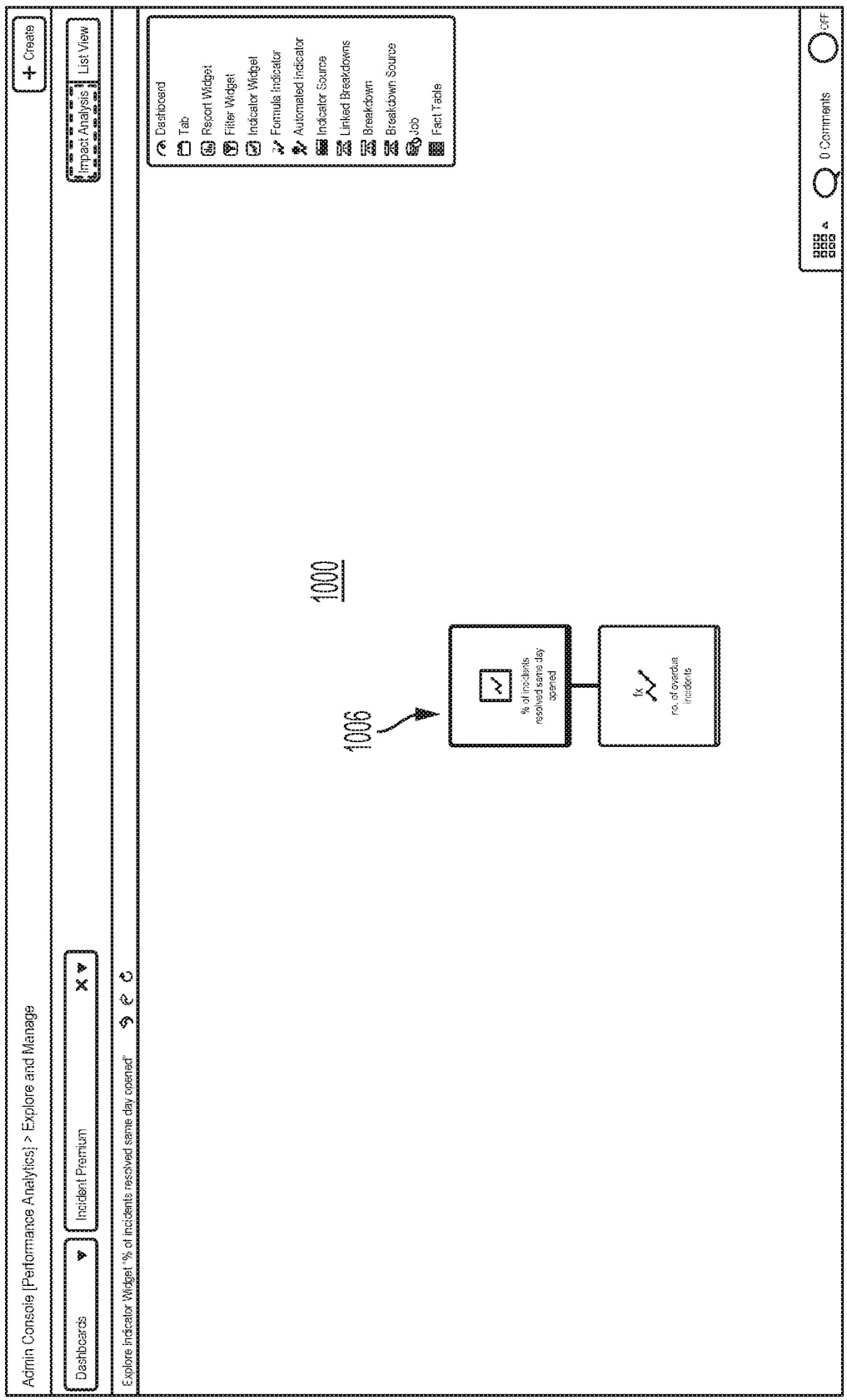
FIG. 10A depicts another example top-down view of an example dependency assessment tree, in accordance with example embodiments.
Figure 10B:
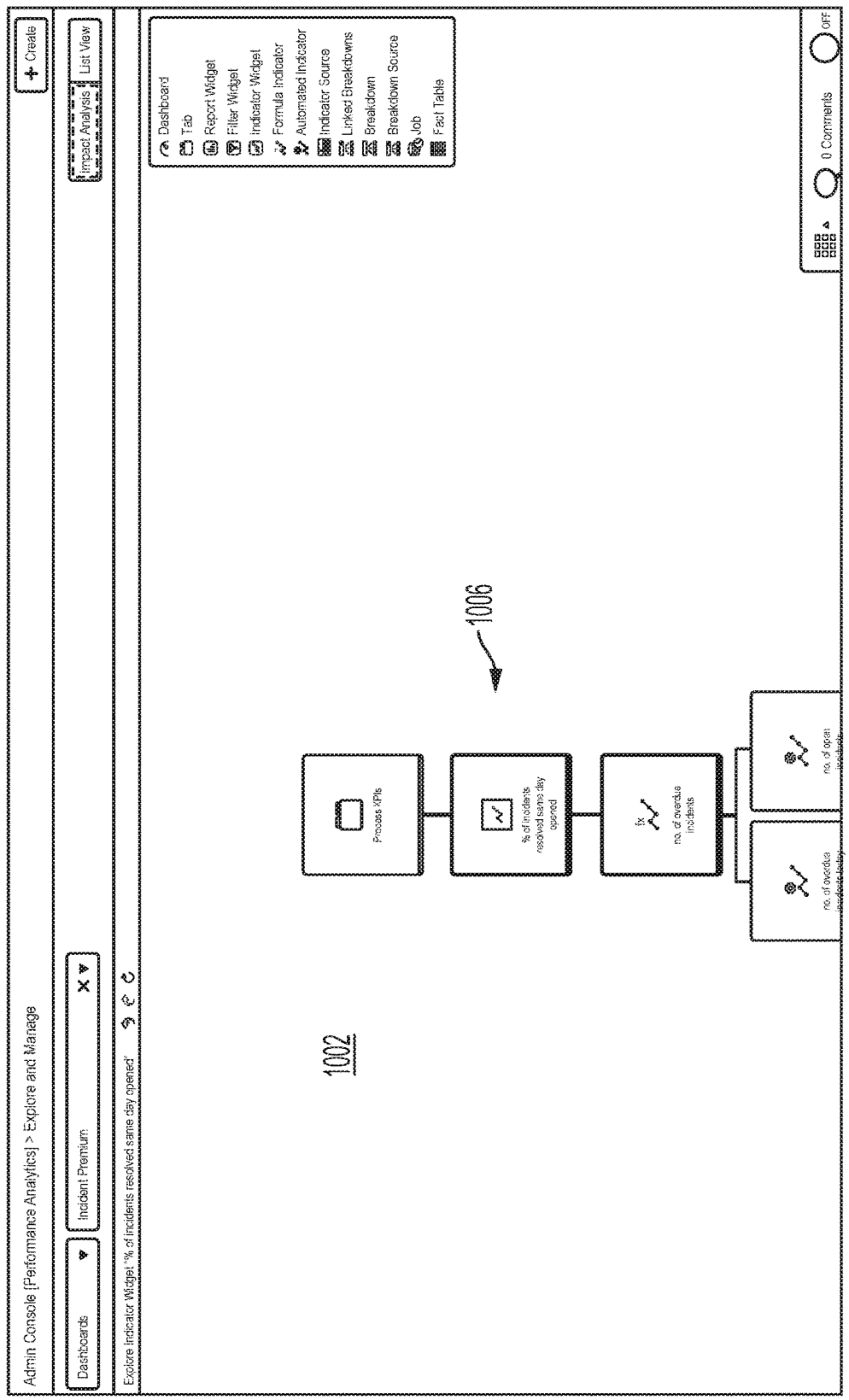
FIG. 10B depicts another example bottom-up view of an example dependency assessment tree, in accordance with example embodiments.

FIGS. 10A and 10B further illustrate examples of top-down and bottom-up tree views that may result from user interactions with, by way of example, PA entity 906. For instance, if a user directly clicks on incidents resolved node 1006, a top-down tree view 1000 may be displayed showing every PA entity that incident resolved node 1006 may need to operate. If a user navigates to the options menu of incidents resolved node 906 and clicks on "Used for," a bottom-up tree view 1002 may be displayed to show all instances where the node is used by other PA entities on the PA system.

The above examples illustrate only a few possible usage scenarios of a dependency assessment tree of a PA system.

It will be appreciated that example embodiments of a dependency assessment tree for PA entities may accommodate other usage as well.

VII. EXAMPLE OPERATIONS

Figure 11:
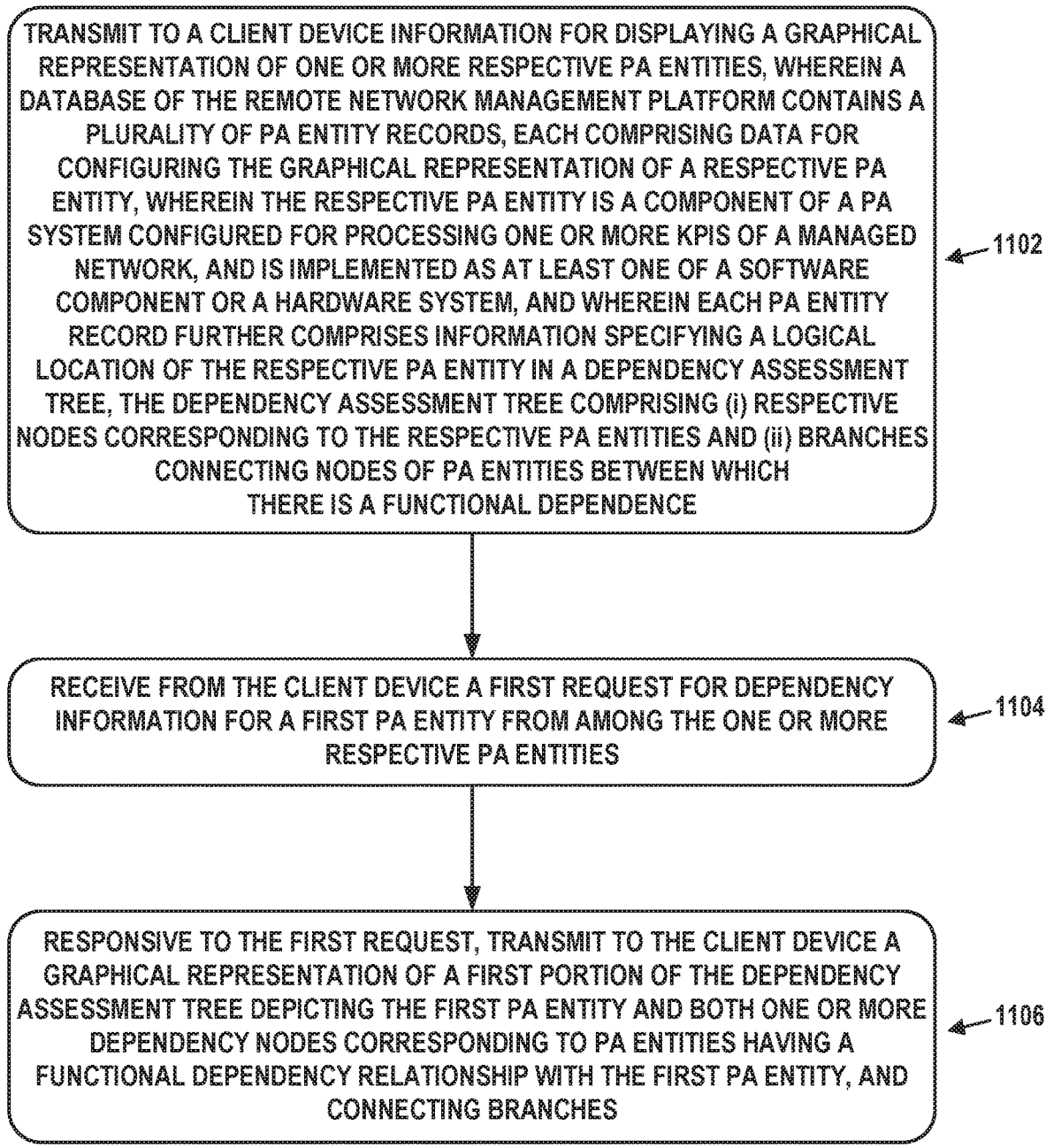
FIG. 11 is a flow chart, in accordance with example embodiments.

FIG. 11 is a flow chart illustrating an example embodiment of a method 1100 for configuring a performance analytics (PA) system, in particular by using a dependency assessment tree. The method illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. In an example embodiment, the method illustrated in FIG. 11 may be carried out by a computing device disposed within a computational instance, such as instance 322, of a remote network management platform, such as platform 320, which remotely manages a managed network, such as network 300. Further, the computing device may be operational to execute a PA software application.

In example embodiments, the example method 1100 may be implemented by a dependency assessment program executing or executable on a computing device. As described, the example method 1100 may include actions and operations carried out by a computing device, some of which involve providing information to a client device or receiving information from the client device. As such, some of these actions and operations may have corresponding actions and operations carried out by the client device. For example, the client device may display certain graphical representations in a graphical user interface (GUI), based on information transmitted or supplied by the computing device. Similarly, some information received by the computing device from the client device may originate from user input at the GUI of the client device. Some these corresponding actions and operations of the client device may thus be considered part of one or more methods corresponding to the example method 1100, and carried out in the client device.

The embodiments of FIG. 11 may be simplified by the removal of any one or more of the features shown therein. Further, these embodiments may be combined with features, aspects, and/or implementations of any of the previous figures or otherwise described herein.

In accordance with example embodiments, the computing device that is configured to carry out the example method 1100 may be part of a PA system that also includes a database containing a plurality of PA entity records. Each PA entity record may include data for configuring a graphical representation of a respective PA entity on a graphical user interface (GUI) within the managed network, such as a GUI on a client device in the managed network. In further accordance with example embodiments, the respective PA entity may be a component of the PA system configured for processing one or more key performance indicators (KPIs) of the managed network, and may be implemented as at least one of a software component or a hardware system. Non-limiting examples of a PA entity include a KPI, a dashboard, a dashboard tab, a scorecard, a widget, a breakdown, or a database. Each PA entity record may further include information specifying a logical location of the respective PA entity in a dependency assessment tree. The dependency assessment tree may take the form of nodes and branches or edges. More particular, respective nodes may correspond to the respective PA entities of the plurality of PA entity records, and branches may connect nodes of PA entities between which there is a functional dependence.

Block 1102 may involve transmitting to a client device information for displaying in a GUI of the client device a graphical representation of one or more respective PA entities. As described above, the respective PA entities are associated with PA entity records of the database, each of which includes data for configuring the graphical representation of a respective PA entity. In a corresponding action, the client device may display the graphical representation of the one or more respective PA entities. FIG. 7 illustrates an example of one such display.

Block 1104 may involve receiving from the client device a first request for dependency information for a first PA entity from among the one or more respective PA entities. For example, referring again to FIGS. 7 and 9, and considering a corresponding action by the client device, a selection of the "Used for" option of the drop-down menu 718 may be received by the computing device as a request for the bottom-up tree view 900.

Finally, block 1106 may involve responding to the first request by transmitting to the client device a graphical representation of a first portion of the dependency assessment tree depicting the first PA entity and one or more dependency nodes. Here, dependency nodes are nodes corresponding to PA entities having a functional dependency relationship with the first PA entity. The first portion of the dependency tree may also include connecting branches between the dependency nodes. For example, referring once more to the example of FIGS. 7 and 9, the first portion the dependency assessment tree could correspond to the bottom-up tree view 900, and the corresponding action of the client device upon receiving the transmitted graphical representation could be to generate the bottom-up tree view 900 in the GUI.

In accordance with example embodiments, the method may further entail receiving from the client device a second request for dependency information for a second PA entity from among the one or more dependency nodes depicted in the first portion of the dependency assessment tree. In response to the second request, the computing device may transmit to the client device a graphical representation of a second portion of the dependency assessment tree depicting the second PA entity and one or more dependency nodes. In this instance, the dependency nodes may correspond to PA entities having a functional dependency relationship with the second PA entity. The second portion of the dependency assessment try may again include connecting branches between the dependency nodes. For example, considering the bottom-up tree view 900 to be the first portion of the dependency assessment tree transmitted by the computing device at block 1106, the PA entity 906 can be taken as an example of the second PA entity, and the second request could be for dependency information relating to the PA entity 906. The response to this second request could then be a graphical representation of the top-down tree view 1000 illustrated in FIG. 10A, which would correspond to the second portion of the dependency assessment tree in this example. Once more, the corresponding action by the client device would be to generate the top-down tree view 1000.

In accordance with example embodiments, and more generally, the respective nodes of the dependency assessment tree may be arranged in a hierarchy of dependency levels. In particular, the one or more dependency with dependency relationships with the first PA entity may consist of one or more nodes at one or more dependency levels below that of the first PA entity, one or more nodes at one or more dependency levels above that of the first PA entity, or a combination of both.

In further accordance with example embodiments, each of the one or more nodes at the one or more dependency levels below that of the first PA entity may correspond to a PA entity that the first PA entity functionally depends on, either directly or via one or more PA entities at one or more intervening dependency levels. In this case, the first request for dependency information may be a request for identification of the one or more nodes at the one or more dependency levels below that of the first PA entity. The first portion of the dependency assessment tree may then correspond to a top-down view of the first PA entity.

In further accordance with example embodiments, each of the one or more nodes at the one or more dependency levels above that of the first PA entity may correspond to a PA entity that functionally depends on the first PA, either directly or via one or more PA entities at one or more intervening dependency levels. In this case, the first request for dependency information may be a request for identification of the one or more nodes at the one or more dependency levels above that of the first PA entity. The first portion of the dependency assessment tree may then correspond to a bottom-up view of the first PA entity.

In accordance with example embodiments, the dependency assessment tree may be derived from a KPI tree of KPIs of the managed network. Thus, as described above, a KPI tree constructed or created for the purpose of supported evaluation and analysis of KPIs in a PA system may be extended to map functional dependencies between PA entities of the PA system.

In further accordance with example embodiments, the example method 1100 may further entail receiving from the client device an update message specifying a change to the first PA entity. Based on the specified change to the first PA entity functionally, the dependency assessment program may determine from among all respective PA entities that are functionally dependent on the first PA entity a conflict set of PA entities for which the specified change would result in erroneous operation of zero or more. Note that the conflict set may be empty if no erroneous operation would result from the change. A graphical representation of the conflict set may then be transmitted to the client device. In corresponding actions, the client device may provide GUI functionality for editing or changing PA entities. The dependency assessment program may evaluate changes to determine the conflict set. The client device may the display conflict set upon receiving the graphical representation from the computing device.

In accordance with example embodiments, the dependency assessment tree may further include a legend that contains a plurality of mappings between visual icons and performance analytics types of the respective PA entities. Corresponding actions or operations carried out by the client device may then include displaying the graphical representation of the first portion of the dependency assessment tree together with a graphical a visual icon of the legend in each of the displayed PA entities.

Other corresponding actions or operations carried out by the client device may then include display of a graphical drop-down menu of operations that can be applied to a given PA entity of a given one of the dependency nodes in response to a visual cursor hovering over a graphical representation of the given one of the dependency nodes. This is just one example of interactive commands or actions that may be carried at the client device as part of the dependency assessment program.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A performance analytics (PA) system disposed within a computational instance of a remote network management platform that is associated with a managed network and configured for processing and analysis of performance data of the managed network, the PA system comprising:

a database containing a plurality of PA entity records, each PA entity record comprising data for configuring a graphical representation of a respective PA entity on a graphical user interface (GUI) within the managed network, wherein the respective PA entity is a component of the PA system configured for processing one or more key performance indicators (KPIs) of the managed network, and is implemented as at least one of a software component or a hardware system, and wherein each PA entity record further comprises information specifying a logical location of the respective PA entity in a dependency assessment tree, the dependency assessment tree comprising (i) respective nodes corresponding to the respective PA entities of the plurality of PA entity records and (ii) branches connecting nodes of PA entities between which there is a functional dependence; and a computing device operational to execute a dependency assessment software program, wherein the dependency assessment software program is configured to:
transmit, to a client device, information for displaying in a GUI of the client device the graphical representation of one or more of the respective PA entities;
receive, from the client device, a first request for dependency information for a first PA entity from among the one or more respective PA entities; and
responsive to the first request, transmit, to the client device, a graphical representation of a first portion of the dependency assessment tree depicting the first PA entity and both one or more dependency nodes corresponding to PA entities having a functional dependency relationship with the first PA entity, and connecting branches.

2. The PA system of claim 1, wherein the dependency assessment software program is further configured to:
receive, from the client device, a second request for dependency information for a second PA entity from among the one or more dependency nodes depicted in the first portion of the dependency assessment tree; and responsive to the second request, transmit, to the client device, a graphical representation of a second portion of the dependency assessment tree depicting the second PA entity and both one or more dependency nodes corresponding to PA entities having a functional dependency relationship with the second PA entity, and connecting branches.

3. The PA system of claim 1, wherein the respective nodes of the dependency assessment tree are arranged in a hierarchy of dependency levels, and wherein the one or more dependency nodes corresponding to the PA entities having a functional dependency relationship with the first PA entity comprise a collection of nodes, the collection of nodes consisting of at least one of: one or more nodes at one or more dependency levels below that of the first PA entity, or one or more nodes at one or more dependency levels above that of the first PA entity.

4. The PA system of claim 3, wherein each of the one or more nodes at the one or more dependency levels below that of the first PA entity corresponds to a PA entity that the first PA entity functionally depends on, either directly or via one or more PA entities at one or more intervening dependency levels, wherein the first request for dependency information comprises a request for identification of the one or more nodes at the one or more dependency levels below that of the first PA entity, and wherein the first portion of the dependency assessment tree corresponds to a top-down view of the first PA entity and one or more of the PA entities that the first PA entity functionally depends on.

5. The PA system of claim 3, wherein each of the one or more nodes at the one or more dependency levels above that of the first PA entity corresponds to a PA entity that functionally depends on the first PA, either directly or via one or more PA entities at one or more intervening dependency levels, wherein the first request for dependency information comprises a request for identification of the one or more nodes at the one or more dependency levels above that of the first PA entity, and wherein the first portion of the dependency assessment tree corresponds to a bottom-up view of the first PA entity and one or more PA entities that functionally depend on the first PA entity.

6. The PA system of claim 1, wherein each PA entity is at least one of: a KPI, a dashboard, a dashboard tab, a scorecard, a widget, a breakdown, or a database.

7. The PA system of claim 1, wherein the dependency assessment tree is derived from a KPI tree of KPIs of the managed network.

8. The PA system of claim 1, wherein the dependency assessment software program is further configured to:

receive, from the client device, an update message specifying a change to the first PA entity;

based on the specified change to the first PA entity functionally, determine from among all respective PA entities that are functionally dependent on the first PA entity a conflict set of zero or more PA entities for which the specified change would result in erroneous operation; and transmit, to the client device, a graphical representation of the conflict set.

9. A client device operable to configure a performance analytics (PA) system disposed within a computational instance of a remote network management platform that is associated with a managed network, the PA system being configured for processing and analysis of performance data of the managed network, the client device configured to:

display, in a graphical user interface (GUI), a graphical representation of one or more PA entities, wherein a database of the remote network management platform contains a plurality of PA entity records, each PA entity record comprising data for configuring the graphical representation of a respective PA entity, wherein the respective PA entity is a component of the PA system configured for processing one or more key performance indicators (KPIs) of the managed network, and is implemented as at least one of a software component or a hardware system, and wherein each PA entity record further comprises information specifying a logical location of the respective PA entity in a dependency assessment tree, the dependency assessment tree comprising (i) respective nodes corresponding to the respective PA entities of the plurality of PA entity records and (ii) branches connecting nodes of PA entities between which there is a functional dependence;

receive, via the GUI, input that selects a first PA entity from among the displayed one or more respective PA entities;

responsive to transmitting, to a computing device disposed within the computational instance of the remote network management platform, a first request for dependency information for the selected first PA entity, receive a graphical representation of a first portion of the dependency assessment tree depicting the first PA entity and both one or more dependency nodes corresponding to PA entities having a functional dependency relationship with the first PA entity, and connecting branches; and display, in the GUI, the graphical representation of the first portion of the dependency assessment tree.

10. The client device of claim 9, wherein the client device is further configured to:

receive, via the GUI, input that selects a second PA entity from among the one or more dependency nodes depicted in the first portion of the dependency assessment tree;

responsive to transmitting to the computing device a second request for dependency information for the selected second PA entity, receive a graphical representation of a second portion of the dependency assessment tree depicting the second PA entity and both one or more dependency nodes corresponding to PA entities having a functional dependency relationship with the second PA entity, and connecting branches; and display, in the GUI, the graphical representation of the second portion of the dependency assessment tree.

11. The client device of claim 9, wherein the respective nodes of the dependency assessment tree are arranged in a hierarchy of dependency levels, and wherein the one or more dependency nodes corresponding to the PA entities having a functional dependency relationship with the first PA entity comprise a collection of nodes, the collection of nodes consisting of at least one of: one or more nodes at one or more dependency levels below that of the first PA entity, or one or more nodes at one or more dependency levels above that of the first PA entity.

12. The client device of claim 11, wherein each of the one or more nodes at the one or more dependency levels below that of the first PA entity corresponds to a PA entity that the first PA entity functionally depends on, either directly or via one or more PA entities at one or more intervening dependency levels, wherein the first request for dependency information comprises a request for identification of the one or more nodes at the one or more dependency levels below that of the first PA entity, and wherein the first portion of the dependency assessment tree corresponds to a top-down view of the first PA entity and one or more of the PA entities that the first PA entity functionally depends on.

13. The client device of claim 11, wherein each of the one or more nodes at the one or more dependency levels above that of the first PA entity corresponds to a PA entity that functionally depends on the first PA, either directly or via one or more PA entities at one or more intervening dependency levels, wherein the first request for dependency information comprises a request for identification of the one or more nodes at the one or more dependency levels above that of the first PA entity, and wherein the first portion of the dependency assessment tree corresponds to a bottom-up view of the first PA entity and one or more PA entities that functionally depend on the first PA entity.

14. The client device of claim 9, wherein each PA entity is at least one of: a KPI, a dashboard, a dashboard tab, a scorecard, a widget, a breakdown, or a database.

15. The client device of claim 9, wherein the dependency assessment tree is derived from a KPI tree of KPIs of the managed network.

16. The client device of claim 9, wherein the client device is further configured to:

transmit to the computing device an update message specifying a change to the first PA entity;

receive from the computing device a graphical representation of a conflict set of PA entities identified from among all respective PA entities that are functionally dependent on the first PA entity, wherein the conflict set contains zero or more PA entities for which the specified change would result in erroneous operation; and display, in the GUI, the graphical representation of the conflict set if the conflict set is not empty.

17. The client device of claim 9, wherein the dependency assessment tree further comprises a legend that contains a plurality of mappings between visual icons and performance analytics types of the respective PA entities, and wherein displaying the graphical representation of the first portion of the dependency assessment tree comprises displaying in a graphical representation of each of the one or more dependency nodes a visual icon corresponding one the visual icon of the legend.

18. The client device of claim 9, wherein the client device is further configured to display a graphical drop-down menu of operations that can be applied to a given PA entity of a given one of the dependency nodes in response to a visual cursor hovering over a graphical representation of the given one of the dependency nodes.

19. A method for configuring a performance analytics (PA) system disposed within a computational instance of a remote network management platform that is associated with a managed network, the PA system being configured for processing and analysis of performance data of the managed network, the method operable on a computing device disposed within the remote network management platform, the method comprising:

transmitting, to a client device, information for displaying in a graphical user interface (GUI) of the client device a graphical representation of one or more respective PA entities, wherein a database of the remote network management platform contains a plurality of PA entity records, each PA entity record comprising data for configuring the graphical representation of a respective PA entity, wherein the respective PA entity is a component of the PA system configured for processing one or more key performance indicators (KPIs) of the managed network, and is implemented as at least one of a software component or a hardware system, and wherein each PA entity record further comprises information specifying a logical location of the respective PA entity in a dependency assessment tree, the dependency assessment tree comprising (i) respective nodes corresponding to the respective PA entities of the plurality of PA entity records and (ii) branches connecting nodes of PA entities between which there is a functional dependence;

receiving, from the client device, a first request for dependency information for a first PA entity from among the one or more respective PA entities; and responsive to the first request, transmitting, to the client device, a graphical representation of a first portion of the dependency assessment tree depicting the first PA entity and both one or more dependency nodes corresponding to PA entities having a functional dependency relationship with the first PA entity, and connecting branches.

20. The method of claim 19, further comprising:

receiving, from the client device, a second request for dependency information for a second PA entity from among the one or more dependency nodes depicted in the first portion of the dependency assessment tree; and responsive to the second request, transmitting, to the client device, a graphical representation of a second portion of the dependency assessment tree depicting the second PA entity and both one or more dependency nodes corresponding to PA entities having a functional dependency relationship with the second PA entity, and connecting branches.

* * * * *